(12) United States Patent
Chen

(10) Patent No.: US 10,286,978 B1
(45) Date of Patent: May 14, 2019

(54) BICYCLE CRANK ARM WITH STRAIN GAUGE

(71) Applicant: TWDT PRECISION CO., LTD., Huatan Township (TW)

(72) Inventor: Cheng-Ho Chen, Huatan Township (TW)

(73) Assignee: TWDT PRECISION CO., LTD., Huatan Township (TW)

( * ) Notice: Subject to any disclaimer, the term of this patent is extended or adjusted under 35 U.S.C. 154(b) by 0 days.

(21) Appl. No.: 15/956,509

(22) Filed: Apr. 18, 2018

(51) Int. Cl.
| | | |
|---|---|---|
| *B62M 3/00* | (2006.01) | |
| *G01L 5/22* | (2006.01) | |
| *B62M 3/16* | (2006.01) | |

(52) U.S. Cl.
CPC ............. *B62M 3/16* (2013.01); *G01L 5/225* (2013.01); *A63B 2220/51* (2013.01); *B62K 2207/00* (2013.01)

(58) Field of Classification Search
CPC . B62M 3/00; B62M 3/16; G01L 5/225; A63B 2220/51; B62K 2207/00
See application file for complete search history.

(56) References Cited

U.S. PATENT DOCUMENTS

| | | | | |
|---|---|---|---|---|
| 2,558,563 A | * | 6/1951 | Janssen | G01H 11/08 246/251 |
| 5,564,797 A | * | 10/1996 | Steiner | B60T 7/06 303/113.4 |
| 6,340,067 B1 | | 1/2002 | Fujiwara et al. | |
| 8,006,574 B2 | * | 8/2011 | Meyer | G01L 3/242 702/44 |
| 8,584,529 B2 | * | 11/2013 | Fisher | B62M 3/00 73/760 |
| 8,828,169 B2 | * | 9/2014 | Nonoshita | B62K 19/10 156/156 |
| 8,881,608 B2 | | 11/2014 | Tetsuka et al. | |
| 9,310,264 B2 | * | 4/2016 | David | G01L 1/044 |
| 9,322,725 B2 | * | 4/2016 | Tetsuka | G01L 3/247 |
| 9,365,261 B2 | * | 6/2016 | Nonoshita | B62K 19/16 |
| 9,459,167 B2 | * | 10/2016 | Heinkel | B62M 3/08 |
| 9,921,118 B2 | * | 3/2018 | Lull | A63B 24/0087 |
| 10,060,738 B2 | * | 8/2018 | Fyfe | G01B 21/32 |
| 2012/0330572 A1 | * | 12/2012 | Longman | B62M 3/00 702/44 |
| 2014/0200835 A1 | * | 7/2014 | Carrasco Vergara | G01L 3/00 702/42 |

* cited by examiner

*Primary Examiner* — Adam D Rogers
(74) *Attorney, Agent, or Firm* — Fish & Richardson P.C.

(57) ABSTRACT

A bicycle crank arm includes a crank body, a metal pad, and a strain gauge. The crank body includes an outer layer which is made from a fiber reinforced resin material, and which extends in a longitudinal direction to surround a body axis. The metal pad is made of a ductile metal, and has a first surface and a second surface which is opposite to the first surface, and which has a predetermined surface area that is disposed on and strained with the outer layer. The strain gauge is disposed on the first surface of the metal pad and is configured to detect mechanical deformation of the metal pad corresponding to a pedaling force applied to the crank body.

9 Claims, 4 Drawing Sheets

BICYCLE CRANK ARM WITH STRAIN GAUGE

FIELD

The disclosure relates to a bicycle crank arm, more particularly to a bicycle crank arm with a strain gauge for detecting a pedaling force applied to a crank body.

BACKGROUND

U.S. Pat. No. 6,340,067 discloses a bicycle equipped with a drive assist, i.e., a motor assist bicycle. When a pedaling force detected by a pedaling force sensor exceeds a reference value, the drive assist is actuated to reduce a loading of a driver. The bicycle includes a drive assist attached to a driving wheel, a driving power transmission means attached between a sprocket and a rear wheel, a pair of pedal levers, a crank lever for transmitting a rotation force of the pedal lever to the sprocket, and a sliding portion serving as a swing fulcrum of the pedal lever. The pedaling force sensor is attached to a part of the pedal lever which makes nearly reciprocating motion, and the output from the sensor is supplied through a single wire or the like to a controller which controls the drive assist.

U.S. patent application publication no. 2014/0200835 discloses a pedaling torque sensor device for bicycles in which strain gauges are non-detachably fixed on an inside of a crank arm.

U.S. Pat. No. 8,881,608 discloses a bicycle crank arm including a crank body, a sensor support member, and a power sensing device. The crank body includes a crank axle mounting portion and a pedal mounting portion. The sensor support member is disposed in a cavity of the crank body and attached to the crank body. The power sensing device is supported on the sensor support member.

SUMMARY

Therefore, an object of the disclosure is to provide a bicycle crank arm in which a strain gauge is disposed on a metal pad which is disposed on and strained with a crank body, and which is deformed more evenly.

According to the disclosure, a bicycle crank arm includes a crank body, a metal pad, and a strain gauge. The crank body extends along a body axis in a longitudinal direction, and includes an outer layer which is made from a fiber reinforced resin material, and which extends in the longitudinal direction to surround the body axis. The metal pad is made of a ductile metal, and has a first surface and a second surface which is opposite to the first surface, and which has a predetermined surface area that is disposed on and strained with the outer layer. The strain gauge is disposed on the first surface of the metal pad and is configured to detect mechanical deformation of the metal pad corresponding to a pedaling force applied to the crank body.

BRIEF DESCRIPTION OF THE DRAWINGS

Other features and advantages of the disclosure will become apparent in the following detailed description of the embodiment(s) with reference to the accompanying drawings, in which.

DETAILED DESCRIPTION

Figure 1:
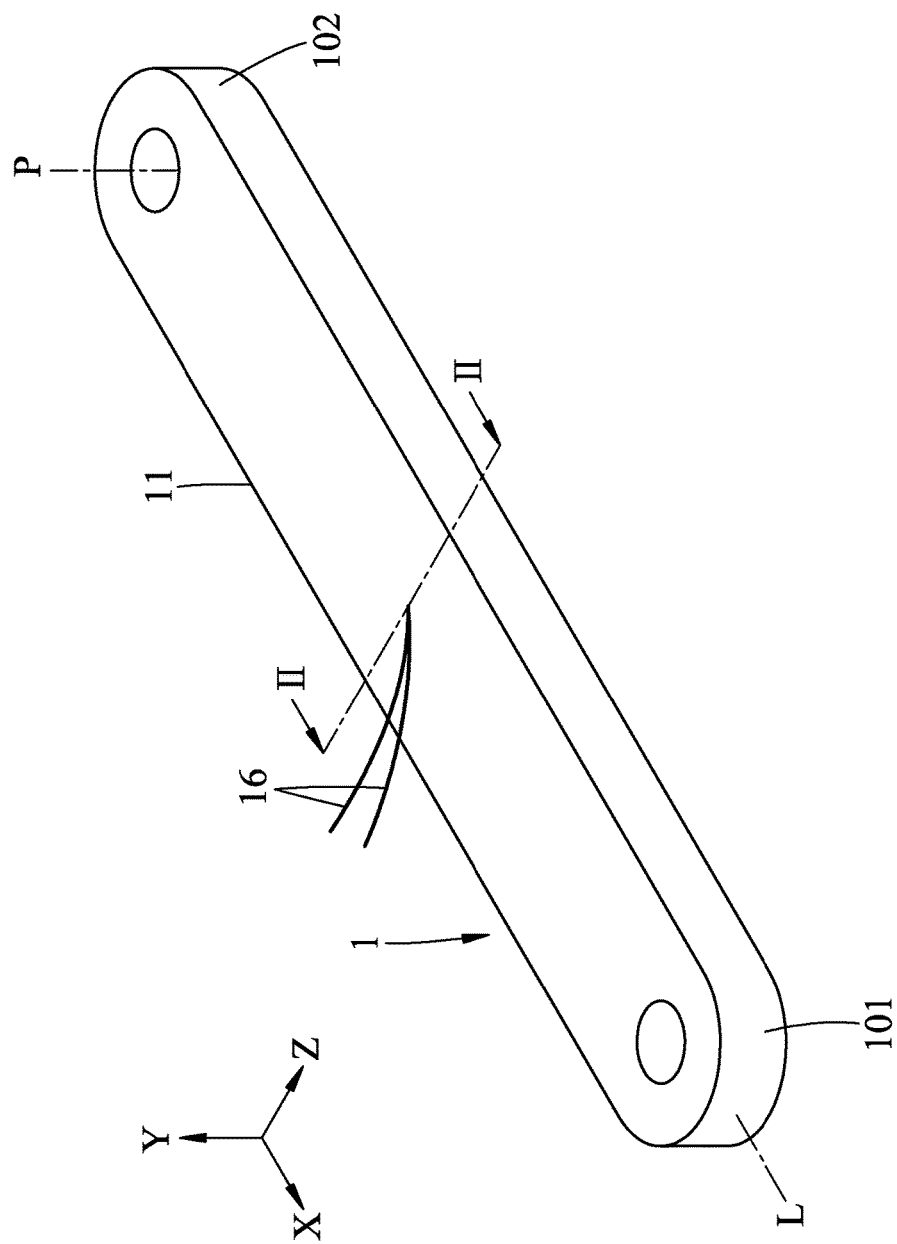
FIG. 1 is a perspective view of a bicycle crank arm according to a first embodiment of the disclosure.

Before the disclosure is described in greater detail, it should be noted that where considered appropriate, reference numerals have been repeated among the figures to indicate corresponding or analogous elements, which may optionally have similar characteristics.

Figure 2:
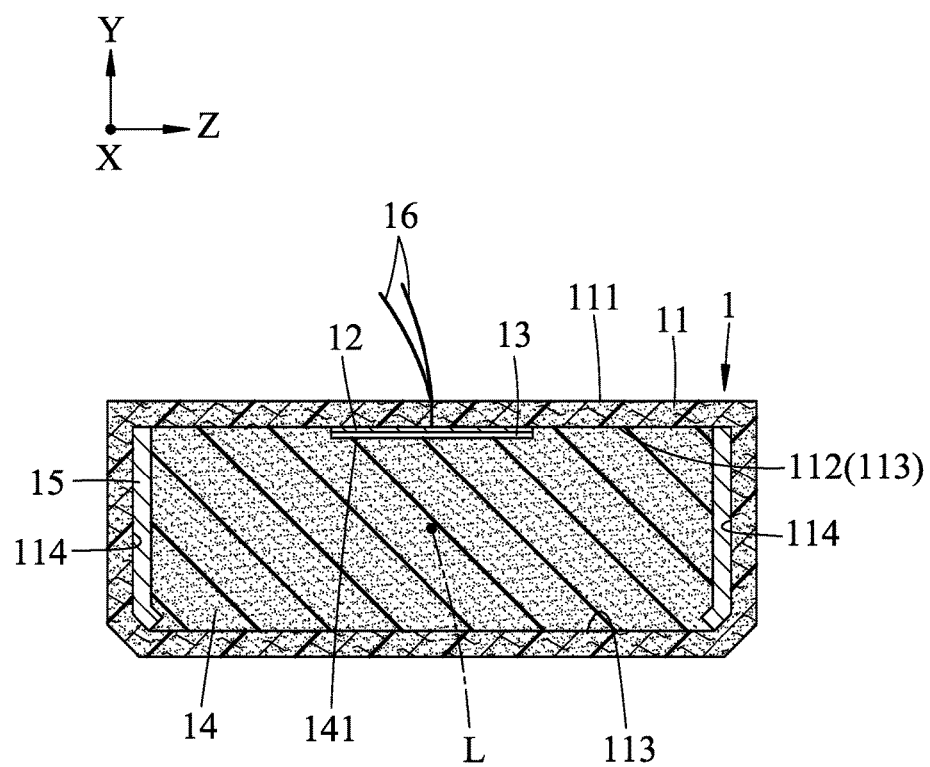
FIG. 2 is a cross-sectional view taken along line II-II of FIG. 1.
Figure 3:
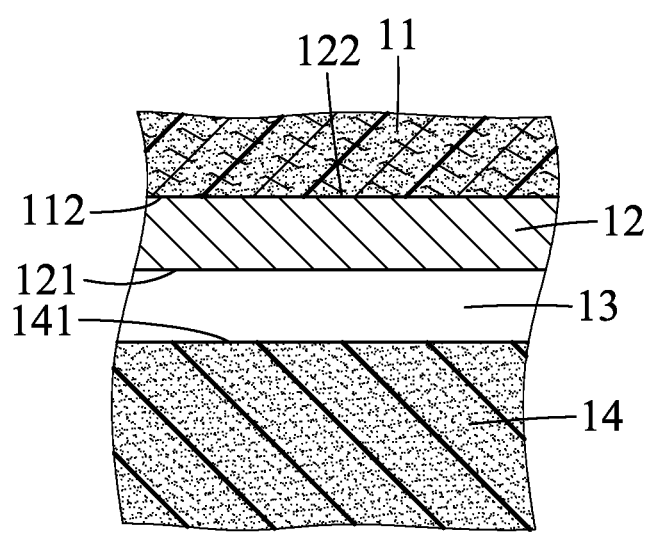
FIG. 3 is a partially enlarged view of FIG. 2.

Referring to FIGS. 1 to 3, a bicycle crank arm according to a first embodiment of this disclosure is shown to include a crank body 1, a metal pad 12, and a strain gauge 13.

It should be noted that the drawings, which are for illustrative purposes only, are not drawn to scale, and are not intended to represent the actual sizes or actual relative sizes of the components of the bicycle crank arm.

The crank body 1 extends along a body axis (L) in a longitudinal direction (X), and includes an outer layer 11 which is made from a fiber reinforced resin material, and which extends in the longitudinal direction (X) to surround the body axis (L).

In this embodiment, the fiber reinforced resin material is a carbon fiber reinforced resin material, and the outer layer 11 has an outward surface 111 and an inward surface 112.

In addition, the outer layer 11 has a first end segment 101 and a second end segment 102 which is opposite to the first end segment 101 in the longitudinal direction (X), and which defines a rotating axis (P) in a first direction (Y) transverse to the longitudinal direction (X) such that when the crank body 1 is subjected to a pedaling force, the first end segment 101 is rotated about the rotating axis (P). The inward surface 112 has two first surface regions 113 and two second surface regions 114. The first surface regions 113 are opposite to each other in the first direction (Y). The second surface regions 114 are opposite to each other in a second direction (Z) transverse to both the longitudinal direction (X) and the first direction (Y).

The metal pad 12 is made of a ductile metal, and has a first surface 121 and a second surface 122 which is opposite to the first surface 122, and which has a predetermined surface area that is disposed on and strained with the outer layer 11. Because the metal pad 12 can be deformed more evenly than the fiber reinforced resin material, and is strained with a predetermined surface area on the outer layer 11, the metal pad 12 can precisely reflect the deformation of the fiber reinforced resin material in the predetermined surface area of the outer layer 11 when the crank body 1 is subjected to a pedaling force.

In this embodiment, the ductile metal is aluminum, and the metal pad 12 is disposed on one of the first surface region 113 of the inward surface 112. In other embodiments, the metal pad 12 may be disposed on the outward surface 111.

The strain gauge 13 is disposed on the first surface 121 of the metal pad 12, and is configured to detect mechanical deformation of the metal pad 12 corresponding to a pedaling force applied to the crank body 1.

In this embodiment, the crank body 1 further includes an inner foam member 14 having a recess 141 to fittingly receive the strain gauge 13 so as to permit the inner foam member 14 to be in intimate contact with the inward surface 112 of the outer layer 11.

In this embodiment, the crank body 1 further includes a metal frame 15 which is configured to hold two sides of the inner foam member 14. In a process for making the bicycle crank arm, the metal pad 12 is attached to the strain gauge 13 and disposed on the inner foam member 14 which is held by the metal frame 15, and a bundle of unidirectional continuous fibers (not shown) is then wound over the inner foam member 14 and the metal frame 15, followed by impregnating the fibers with a curable resin material and curing the resin material, so as to form the outer layer 11 and to form the recess 141 on the inner foam member 14.

In this embodiment, the strain gauge 13 is electrically connected to a communication device (not shown) in a conventional manner using two electrical wires 16. The communication device is used for receiving signals from the strain gauge 13 and wirelessly transmitting information to one or more electrical bicycle components. The communication device may be mounted on the outward surface 111 of the outer layer 11. Alternatively, the communication device may be disposed inside a crank axle (not shown) which coupled to the second end segment 102 of the outer layer 11.

Figure 4:
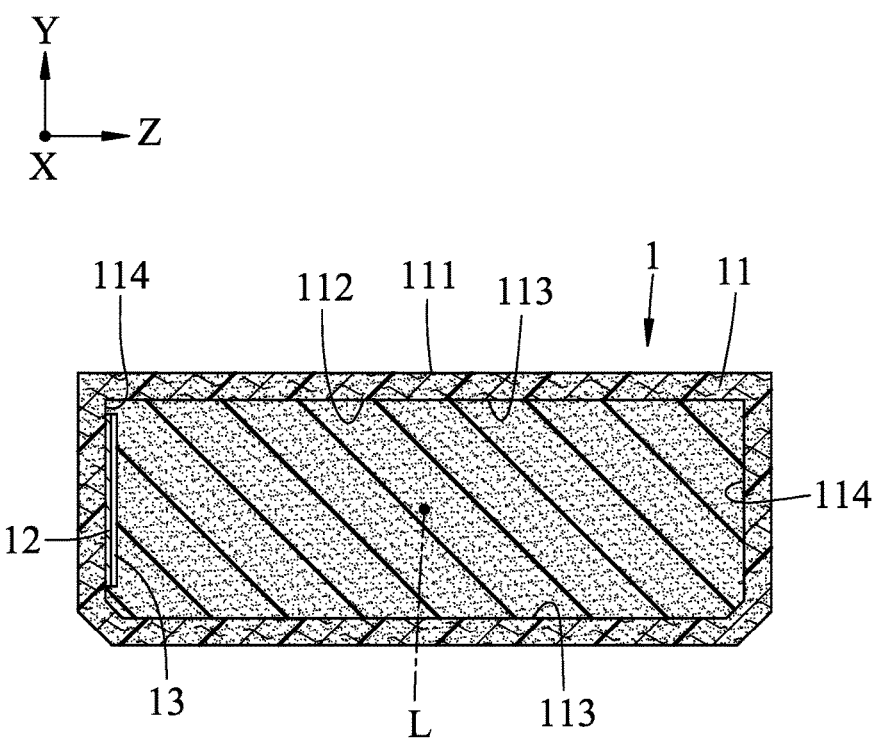
FIG. 4 is a cross-sectional view of a bicycle crank arm according to a second embodiment of the disclosure.

FIG. 4 is a cross-sectional view of a bicycle crank arm according to a second embodiment of the disclosure. The second embodiment is similar to the first embodiment except that in the second embodiment, the metal pad 12 is disposed on one of the second surface regions 114, and the metal frame 15 is not included.

Please note that the crank body 1 in the first or second embodiment may be formed according to a method disclosed in U.S. patent application Ser. No. 15/691,164, the disclosure of which is incorporated in its entirety herein by reference.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A bicycle crank arm comprising:
   a crank body extending along a body axis in a longitudinal direction, and including an outer layer which is made from a fiber reinforced resin material, and which extends in the longitudinal direction to surround the body axis;
   a metal pad made of a ductile metal, and having a first surface and a second surface which is opposite to said first surface, and which has a predetermined surface area that is disposed on and strained with said outer layer; and
   a strain gauge disposed on said first surface of said metal pad and configured to detect mechanical deformation of said metal pad corresponding to a pedaling force applied to said crank body;
   wherein said outer layer has an outward surface and an inward surface on which said metal pad is disposed; and
   wherein said crank body further includes an inner foam member having a recess to fittingly receive said strain gauge so as to permit said inner foam member to be in contact with said inward surface of said outer layer.

2. The bicycle crank arm according to claim 1, wherein said outer layer has a first end segment and a second end segment which is opposite to said first end segment in the longitudinal direction, and which defines a rotating axis in a first direction transverse to the longitudinal direction such that when said crank body is subjected to the pedaling force, said first end segment is rotated about the rotating axis, said inward surface having two first surface regions which are opposite to each other in the first direction, said metal pad being disposed on one of said first surface regions.

3. The bicycle crank arm according to claim 1, wherein said outer layer has a first end segment and a second end segment which is opposite to said first end segment in the longitudinal direction, and which defines a rotating axis in a first direction transverse to the longitudinal direction such that when said crank body is subjected to the pedaling force, said first end segment is rotated about the rotating axis, said inward surface having two surface regions which are opposite to each other in a second direction transverse to both the longitudinal direction and the first direction, said metal pad being disposed on one of said two surface regions.

4. The bicycle crank arm according to claim 1, wherein said fiber reinforced resin material is a carbon fiber reinforced resin material.

5. The bicycle crank arm according to claim 4, wherein said outer layer has a first end segment and a second end segment which is opposite to said first end segment in the longitudinal direction, and which defines a rotating axis in a first direction transverse to the longitudinal direction such that when said crank body is subjected to the pedaling force, said first end segment is rotated about the rotating axis, said inward surface having two first surface regions which are opposite to each other in the first direction, said metal pad being disposed on one of said first surface regions.

6. The bicycle crank arm according to claim 4, wherein said outer layer has a first end segment and a second end segment which is opposite to said first end segment in the longitudinal direction, and which defines a rotating axis in a first direction transverse to the longitudinal direction such that when said crank body is subjected to the pedaling force, said first end segment is rotated about the rotating axis, said inward surface having two surface regions which are opposite to each other in a second direction transverse to both the longitudinal direction and the first direction, said metal pad being disposed on one of said two surface regions.

7. The bicycle crank arm according to claim 4, wherein said ductile metal is aluminum.

8. The bicycle crank arm according to claim 7, wherein said outer layer has a first end segment and a second end segment which is opposite to said first end segment in the longitudinal direction, and which defines a rotating axis in a first direction transverse to the longitudinal direction such that when said crank body is subjected to the pedaling force, said first end segment is rotated about the rotating axis, said inward surface having two first surface regions which are opposite to each other in the first direction, said metal pad being disposed on one of said first surface regions.

9. The bicycle crank arm according to claim 7, wherein said outer layer has a first end segment and a second end segment which is opposite to said first end segment in the longitudinal direction, and which defines a rotating axis in a first direction transverse to the longitudinal direction such that when said crank body is subjected to the pedaling force, said first end segment is rotated about the rotating axis, said inward surface having two surface regions which are opposite to each other in a second direction transverse to both the longitudinal direction and the first direction, said metal pad being disposed on one of said two surface regions.

* * * * *